United States Patent [19]
Jen et al.

[11] Patent Number: 5,291,586
[45] Date of Patent: Mar. 1, 1994

[54] HARDWARE IMPLEMENTATION OF COMPLEX DATA TRANSFER INSTRUCTIONS

[75] Inventors: Amy K. Jen, Vestal; Patricia A. Gage; Agnes Y. Ngai, both of Endwell, all of N.Y.

[73] Assignee: International Business Machines Corporation, Armonk, N.Y.

[21] Appl. No.: 916,797

[22] Filed: Jul. 17, 1992

Related U.S. Application Data

[63] Continuation of Ser. No. 291,510, Dec. 29, 1988, abandoned.

[51] Int. Cl.⁵ ................. G06P 13/14; G06P 13/28
[52] U.S. Cl. .................. 395/500; 395/425; 395/375; 364/DIG. 1; 364/254.3
[58] Field of Search ............. 395/800, 375, 425

[56] References Cited

U.S. PATENT DOCUMENTS

| | | | |
|---|---|---|---|
| 3,886,523 | 5/1975 | Ferguson et al. | 364/200 |
| 4,080,648 | 3/1978 | Asano et al. | 364/200 |
| 4,168,523 | 9/1979 | Chari et al. | 364/200 |
| 4,199,811 | 4/1980 | Borgerson et al. | 364/200 |
| 4,298,927 | 11/1981 | Berglund et al. | 364/200 |
| 4,307,445 | 12/1981 | Tredennick et al. | 364/200 |
| 4,315,308 | 2/1982 | Jackson | 364/200 |
| 4,319,324 | 3/1982 | Johnson et al. | 364/200 |
| 4,325,120 | 4/1982 | Colley et al. | 364/200 |
| 4,361,869 | 11/1982 | Johnson et al. | 364/200 |
| 4,367,524 | 1/1983 | Budde et al. | 364/200 |
| 4,370,712 | 1/1983 | Johnson et al. | 364/200 |
| 4,384,324 | 5/1983 | Kim et al. | 364/200 |
| 4,415,969 | 11/1983 | Bayliss et al. | 364/200 |
| 4,438,493 | 3/1984 | Cushing et al. | 364/200 |
| 4,472,772 | 9/1984 | Flora | 364/200 |
| 4,491,908 | 1/1985 | Woods et al. | 364/200 |
| 4,493,020 | 1/1985 | Kim et al. | 364/200 |
| 4,539,087 | 5/1986 | Auslander et al. | 364/768 |
| 4,716,545 | 12/1987 | Whipple et al. | 364/900 |
| 4,745,547 | 5/1988 | Buchholz et al. | 364/200 |
| 4,825,355 | 4/1989 | Kurakazu et al. | 364/200 |
| 4,839,797 | 6/1989 | Katori et al. | 364/200 |
| 4,862,351 | 8/1989 | Green et al. | 364/200 |
| 4,876,639 | 10/1989 | Mensch, Jr. | 364/200 |
| 4,947,316 | 8/1990 | Fisk et al. | 395/375 |
| 4,992,934 | 2/1991 | Portanova et al. | 395/375 |
| 5,136,696 | 8/1992 | Beckwith et al. | 395/375 |

OTHER PUBLICATIONS

IBM Technical Disclosure Bulletin, vol. 19, No. 1, Jun. 1976, "Data Length Calculation Hardware".
IBM Technical Disclosure Bulletin, vol. 25, No. 4, Sep. 1982, "Efficient Handling of Load Multiple Instruction".

*Primary Examiner*—Joseph L. Dixon
*Assistant Examiner*—L. Donaghue
*Attorney, Agent, or Firm*—Arthur J. Samodovitz; Hugh D. Jaeger

[57] ABSTRACT

Apparatus for improving the efficiency of computer instructions which transfer data from memory to machine registers and from machine registers to memory. The difficulty arises because such instructions may require data transfers of a variable number of bytes, may involve transfer across word boundaries within memory, and may use a number of machine registers. These features are important to programs which process variable amounts of data at different storage locations. Such transfer operations are performed by "mini-instructions", which are a proper subset of instructions that already exist within the current repertoire. However, the "mini-instructions" used are limited in the use of variables to only those which make most effective use of the hardware architecture. One or more "mini-instructions" must be used to execute the actual software instruction. Because the mini-instructions needed are a proper subset of the actual software instruction, little additional hardware is required. The result is a control structure which executes a given actual software instruction a number of times, but with variables which change to accomplish complex data transfers without resort to microcode or other lower level hardware languages.

13 Claims, 5 Drawing Sheets

HARDWARE IMPLEMENTATION OF COMPLEX DATA TRANSFER INSTRUCTIONS

This application is a continuation, of application Ser. No. 07/291,510, filed Dec. 29, 1988 now abandoned.

TECHNICAL FIELD

The subject matter of this invention pertains to computing systems, and more particularly, to an improved, high performance, multiprocessor and uniprocessor computer system.

In the design and development of computer systems, increasing emphasis is being placed on performance of such systems. The performance is very often a function of the technology used in manufacturing the integrated circuit chips which comprise the computer system. One such technology, new in the development of computer systems, is Complementary Metal Oxide Semiconductor (CMOS) technology. CMOS technology provides a greater degree of reliability, serviceability, and availability than seen before in prior computer systems, due mostly to a reduction in the physical number of chips which comprise the computer system. Since a scarcity of input/output pins on chips has been a problem with prior computer systems, a reduction in the number of chips, as a result of the use of CMOS technology, reduces the number of interconnections (input/output pins) between chips. In addition, performance may also be a function of the number of processors which comprise the computer system.

BACKGROUND ART

A major problem with such advanced technology computer systems is the need to provide data transfer instructions which permit the loading from memory to machine registers and the storing from machine registers to memory of data fields of multiple lengths. U.S. Pat. No. 4,745,547, issued on May 17, 1988 to Buchholz et al. assigned to the same assignee as this patent application teaches the need for this function in vector processing.

One way of accomplishing this is through the use of block transfers as in Input/Output type operations. U.S. Pat. No. 4,370,712 issued to Johnson et al. on Jan. 25, 1983, and U.S. Pat. No. 4,438,493 issued to Cushing et al. on Mar. 20, 1984, teach block transfer techniques. The overhead of such operations, however, makes them not as useful for intraprocessor transfers as for I/O transfers of large blocks of data.

A simple, special purpose method of data transfer is taught by Whipple, et al. in U.S. Pat. No. 4,716,545 issued on Dec. 29, 1987. This technique is special purpose in that it is restricted to a doubleword read or write. A brute-force method of implementing the Whipple, et al. doubleword transfer is taught by Johnson et al. in U.S. Pat. No. 4,361,869 issued on Nov. 30, 1982. This approach doubles the bus width, thereby speeding the transfer between memory and processor. Unfortunately, this approach does not provide great flexibility in the use of variable width fields.

A much more flexible approach is taught in U.S. Pat. No. 4,491,908 issued to Woods et al. on Jan. 1, 1985. This technique transfers up to four (4) words by specifying the operand length in one field of the transfer instruction. A microprogram is used to decode this field and make the actual transfer. However, the implementation in firmware, though flexible, is inherently slow.

Another means of decoding the variable operand length field is by table look-up as taught in *IBM Technical Disclosure Bulletin*, Volume 19, No. 1, dated June, 1976, by Plant et al. *IBM Technical Disclosure Bulletin*, Volume 25, No. 4, dated September, 1982, by Nair et al. describes the problems associated with cache management when doing multiple word transfers.

DISCLOSURE OF THE INVENTION

The present invention overcomes the problems found in the prior art by adding hardware to reduce run time penalties associated with the over use of firmware in implementation. In the preferred embodiment, the ease of design is added by permitting the hardware to execute software specified transfers from one to sixty-four, eight-bit bytes for both load and store instructions.

The hardware complexity is reduced by using essentially the same hardware as now exists. The special case conditions are removed, thereby potentially simplifying the hardware. Some additional circuitry is necessary, however, to create the "mini-instruction" program which emulates the actual software instruction.

The penalty associated with microprogram implementation is not experienced because the mini-instructions are executed with the existing hardware architecture.

The execution of a complex multiple load or store instruction begins with decoding as in the normal case. When the specific instruction is identified, the fields are examined to determine whether a special condition exists which requires the use of one or more "mini-instructions". Such special cases include beginning or ending a transfer at byte boundaries which are inconsistent with normal word boundaries; beginning or ending a transfer at byte boundaries which are inconsistent with normal doubleword boundaries, and greater than eight byte data transfers. If no such special case exists, the instruction is simply executed as in the prior art machine. If a special case is found, newly added control logic ensures that the current instruction is executed a number of times with a series of variables set into the control fields to effect the desired complex load or store in the most efficient manner. Each execution is termed a "mini-instruction" because it is executed with the existing software architecture, but has limitations on allowable variables to ensure most efficient runtime execution.

DESCRIPTION OF THE INVENTION

System Architecture

The present invention is preferably embodied in a modern computer system with an IBM System 370 architecture having single or multiple processors. Such systems are herein described.

Figure 1:
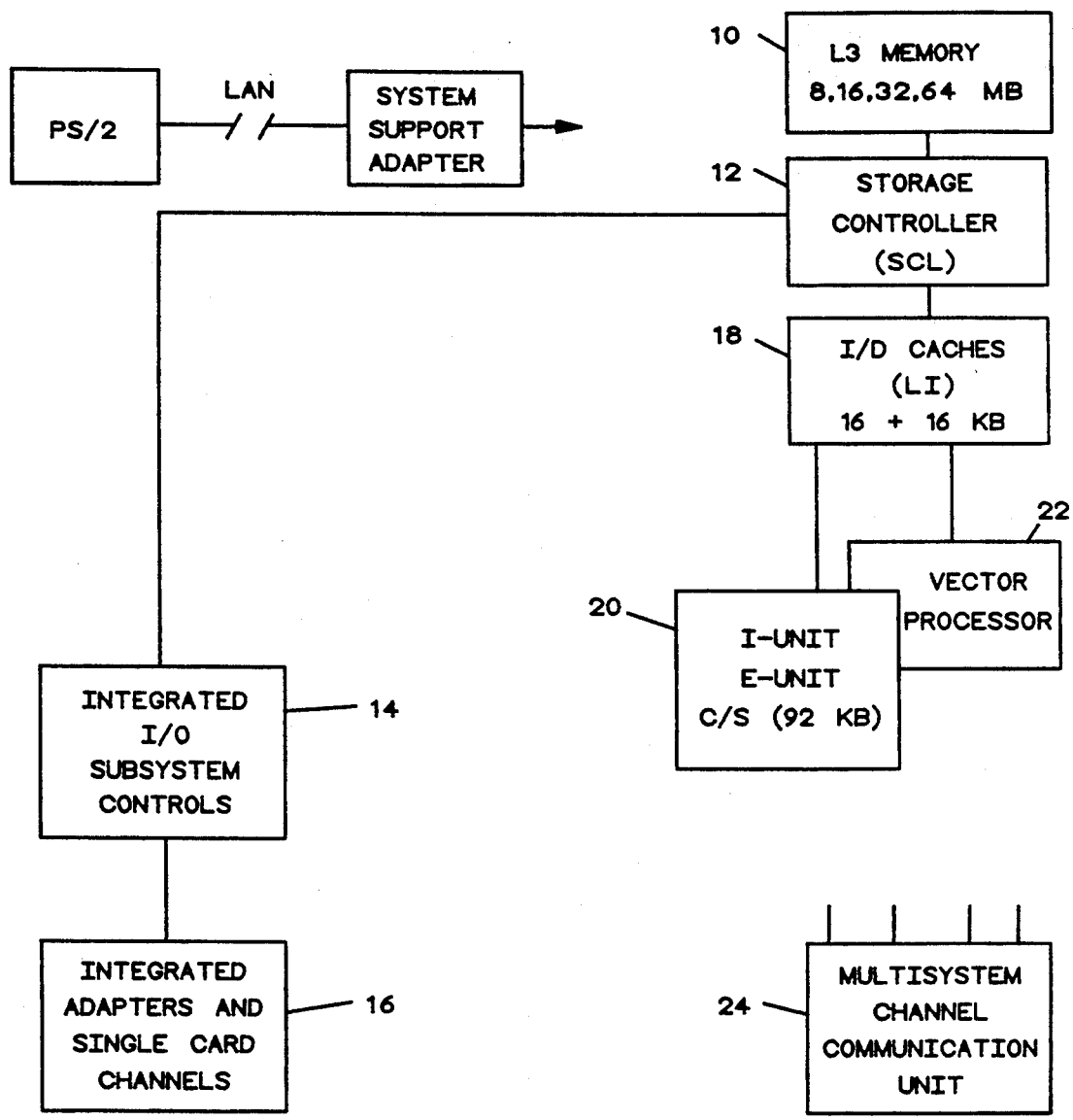
FIG. 1 is a block diagram of a single processor computer system which employs the present invention.

Referring to FIG. 1, a uniprocessor computer system employing the present invention is illustrated. In FIG. 1 the uniprocessor system comprises an L3 memory 10 connected to a storage controller (SCL) 12. On one end, the storage controller 12 is connected to integrated I/O subsystem controls 14, the controls 14 being connected to integrated adapters and single card channels 16. On the other end, the storage controller 12 is connected to I/D caches (L1) 18, which comprise an instruction cache, and a data cache, collectively termed the "L1" cache. The I/D caches 18 are connected to an Instruction unit (I-unit), an Execution unit (E-unit), a control store 20 and a vector processor (VP) 22. The vector processor 22 is described in patent application Ser. No. 530,842, filed Sep. 9, 1983, entitled "High Performance Parallel Vector Processor", now U.S. Pat. No. 4,967,343, the disclosure of which is incorporated by reference into the specification of this application. The uniprocessor system of FIG. 1 also comprises the multisystem channel communication unit 24.

The L3 memory 10 comprises 2 "intelligent" memory cards. The cards are "intelligent" due to the existence of certain specific features: error checking and correction, extended error checking and correction (ECC) refresh address registers and counters, and bit spare capability. The interface to the L3 memory 10 is 8-bytes wide. Memory sizes are 8, 16, 32 and 64 megabytes. The L3 memory is connected to a storage controller (SCL) 12.

The storage controller 12 comprises three bus arbiters arbitrating for access to the L3 memory 10, to the I/O subsystem controls 14, and to the I/D caches 18. The storage controller further includes a directory which is responsible for searching the instruction and data caches 18, otherwise termed the L1 cache, for data. If the data is located in the L1 caches 18, but the data is obsolete, the storage controller 12 invalidates the obsolete data in the L1 caches 18 thereby allowing the I/O subsystem controls 14 to update the data in the L3 memory 10. Thereafter, instruction/execution units 20 must obtain the updated data from the L3 memory 10. The storage controller 12 further includes a plurality of buffers for buffering data being input to L3 memory 10 from the I/O subsystem controls 14 and for buffering data being input to L3 memory 10 from instruction/execution units 20. The buffer associated with the instruction/execution units 20 is a 256 byte line buffer which allows the building of entries 8 bytes at a time for certain types of instructions, such as sequential operations. This line buffer, when full, will cause a block transfer of data to L3 memory to occur. Therefore, memory operations are reduced from a number of individual store operations to a much smaller number of line transfers.

The instruction/data caches 18 are each 16K byte caches. The interface to the storage controller 12 is 8 bytes wide; thus, an inpage operation from the storage controller 12 takes 8 data transfer cycles. The data cache 18 is a "store through" cache, which means that data from the instruction/execution units 20 are stored in L3 memory and, if the corresponding obsolete data is not present in the L1 caches 18, the data is not brought into and stored in the L1 caches. To assist this operation, a "store buffer" is present with the L1 data cache 18 which is capable of buffering up to 8 store operations.

The vector processor 22 is connected to the data cache 18. It shares the dataflow of the instruction/execution unit 20 into the storage controller 12, but the vector processor 22 will not, while it is operating, permit the instruction/execution unit 20 to make accesses into the storage controller 12 for the fetching of data.

The integrated I/O subsystem 14 is connected to the storage controller 12 via an 8-byte bus. The subsystem 14 comprises three 64-byte buffers used to synchronize data coming from the integrated I/O subsystem 14 with the storage controller 12. That is, the instruction/execution unit 20 and the I/O subsystem 14 operate on different clocks, the synchronization of the two clocks being achieved by the three 64-byte buffer structure.

The multisystem channel communication unit 24 is a 4-port channel-to-channel adapter, packaged externally to the system.

Figure 2:
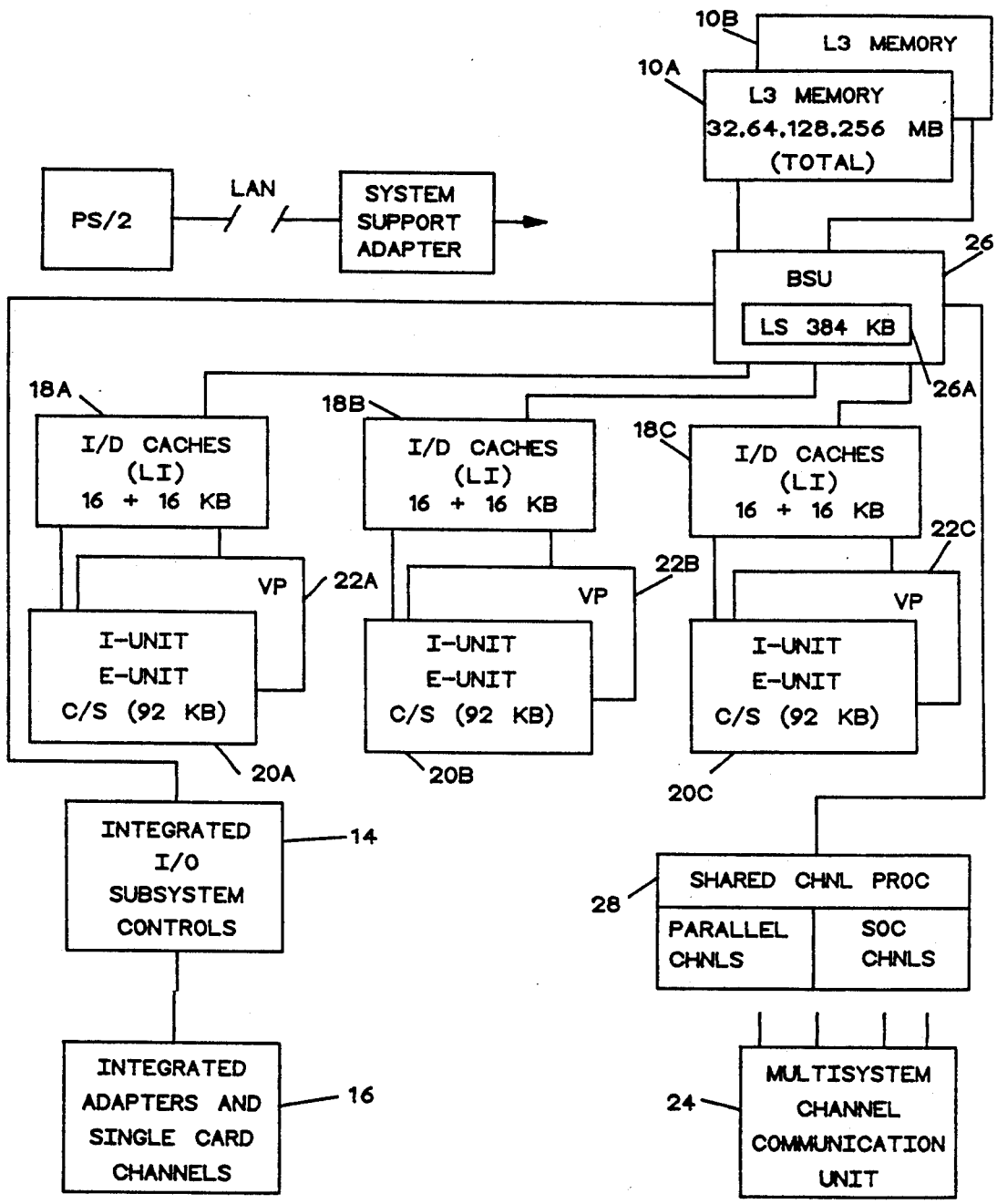
FIG. 2 is a block diagram of a multiple processor computer system which employs the present invention.

Referring to FIG. 2, a triadic (multiprocessor) system employing the present invention is illustrated. In FIG. 2, a pair of L3 memories 10a/10b are connected to a bus switching unit (BSU) 26, the BSU including an L2 cache 26a. The BSU 26 is connected to the integrated I/O subsystem 14, to shared channel processor 28, and to three processors: a first processor including instruction/data caches 18a and instruction/execution unit/control store 20a, a second processor including instruction/data caches 18b and instruction/execution units/control store 20b, and a third processor including instruction/data caches 18c and instruction/execution units/control store 20c. Each of the instruction/data caches 18a, 18b, and 18c are termed "L1" caches. The cache in the BSU 26 is termed the L2 cache 26a, and the main memory 10a/10b is termed the L3 memory.

The BSU 26 connects the three processors 18a/20a, 18b/20b, and 18c/20c, two L3 memory ports 10a/10b, two shared channel processors 28, and an integrated I/O subsystem 14. The BSU 26 comprises circuits which decide the priority for requests to be handled, such as requests from each of the three processors to L3 memory, or requests from the I/O subsystem 14 or shared channel processors, circuits which operate the interfaces, and circuits to access the L2 cache 26a. The L2 cache 26a is a "store in" cache, meaning that operations which access the L2 cache, to modify data, must also modify data resident in the L2 cache (the only exception to this rule is that, if the operation originates from the I/O subsystem 14, and if the data is resident only in L3 memory 10a/10b and not in L2 cache 26a, the data is modified only in L3 memory, not in L2 cache). The system also containing vector processors 22a, 22b, and 22c associated with instruction/execution units 20a, 20b and 20c, respectively.

The interface between the BSU 26 and L3 memories 10a/10b comprises two 16-byte lines/ports in lieu of the single 8-byte port in FIG. 1. However, the memory 10 of FIG. 1 is identical to the memory cards 10a/10b of FIG. 2. The two memory cards 10a/10b of FIG. 2 are accesses in parallel.

The shared channel processor 28 is connected to the BSU 26 via two ports, each port being an 8-byte interface. The shared channel processor 28 is operated at a frequency which is independent of the BSU 26, the clocks within the BSU being synchronized with the clocks in the shared channel processor 28 in a manner which is similar to the clock synchronization between the storage controller 12 and the integrated I/O subsystem 14 of FIG. 1.

A functional description of the operation of the uniprocessor computer system of FIG. 1 will be set forth in the following paragraphs with reference to FIG. 1. Normally, instructions are resident in the instruction cache (L1 cache) 18, waiting to be executed. The instruction/execution unit 20 searches a directory disposed within the L1 cache 18 to determine if the typical instruction is stored therein. If the instruction is not stored in the L1 cache 18, the instruction/execution unit 20 will generate a storage request to the storage controller 12. The address of the instruction, or the cache line containing the instruction will be provided to the storage controller 12. The storage controller 12 will arbitrate for access to the bus connected to the L3 memory 10. Eventually, the request from the instruction/execution unit 20 will be passed to the L3 memory 10, the request comprising a command indicating a line in L3 memory is to be fetched for transfer to the instruction-/execution unit 20. The L3 memory will latch the request, decode it, select the location in the memory card wherein the instruction is stored, and, after a few cycles of delay, the instruction will be delivered to the storage controller 12 from the L3 memory in 8-byte increments. The instruction is then transmitted from the storage controller 12 to the instruction cache (L1 cache) 18, wherein it is temporarily stored. The instruction is retransmitted from the instruction cache 18 to the instruction buffer within the instruction/execution unit 20. The instruction is decoded via a decoder within the instruction unit 20. Quite often, an operand is needed in order to execute the instruction, the operand being resident in memory 10. The instruction/execution unit 20 searches the directory in the data cache 18; if the operand is not found in the directory of the data cache 18, another storage access is issued by the instruction/execution unit 20 to access the L3 memory 10, exactly in the manner described above with respect to the instruction cache miss. The operand is stored in the data cache, the instruction/execution unit 20 searching the data cache 18 for the operand. If the instruction requires the use of microcode, the instruction/execution unit 20 makes use of the microcode resident on the instruction execution unit 20 card. If an input/output (I/O) operation need be performed, the instruction/execution unit 20 decodes an I/O instruction, resident in the instruction cache 18. Information is stored in an auxiliary portion of L3 memory 10, which is sectioned off from instruction/execution. At that point, the instruction/execution unit 20 informs the integrated I/O subsystem 14 that such information is stored in L3 memory, the subsystem 14 processor accessing the L3 memory 10 to fetch the information.

A functional description of the operation of the multiprocessor computer system of FIG. 2 will be set forth in the following paragraphs with reference to FIG. 2. In FIG. 2, assume that a particular instruction/execution unit, one of 20a, 20b or 20c, requires an instruction and searches its own L1 cache, one of 18a, 18b or 18c, for the desired instruction. Assume further that the desired instruction is not resident in the L1 cache. The particular instruction execution unit will then request access to the BSU 26 in order to search the L2 cache disposed therein. The BSU 26 contains an arbiter which receives requests from each of the instruction/execution units 20a, 20b, 20c and from the shared channel processor 28 and from the integrated I/O subsystem 14, the arbiter granting access to one of these units at a time. When the particular instruction/execution unit (one of 20a–20c) is granted access to the BSU to search the L2 cache 26a, the particular instruction/execution unit searches the directory of the L2 cache 26a disposed within the BSU 26 for the desired instruction. Assume that the desired instruction is found in the L2 cache. In that case, the desired instruction is returned to the particular instruction/execution unit. If the desired instruction is not located within the L2 cache, as indicated by its directory, a request is made to the L3 memory, one of 10a or 10b, for the desired instruction. If the desired instruction is located in the L3 memory, it is immediately transmitted to the BSU 26, 16 bytes at a time, and is bypassed to the particular instruction/execution unit (one of 20a–20c) while simultaneously being stored in the L2 cache 26a in the BSU 26. Additional functions resident within the BSU relate to rules for storage consistency in a multiprocessor system. For example, when a particular instruction/execution unit 20c (otherwise termed "processor" 20c) modifies data, that data must be made visible to all other instruction/execution units, or "Processors", 20a, 20b in the complex. If processor 20c modifies data presently stored in its L1 cache 18c, a search for that particular data is made in the L2 cache directory 26a of the BSU 26. If found, the particular data is modified to reflect the modification in the L1 cache 18c. Furthermore, the other processors 20a and 20b are permitted to see the modified, correct data now resident in the L2 cache 26a in order to permit such other processors to modify their corresponding data resident in their L1 caches 18a and 18b. The subject processor 20c cannot reaccess the particular data until the other processors 20a and 20b have had a chance to modify their corresponding data accordingly.

Figure 3:
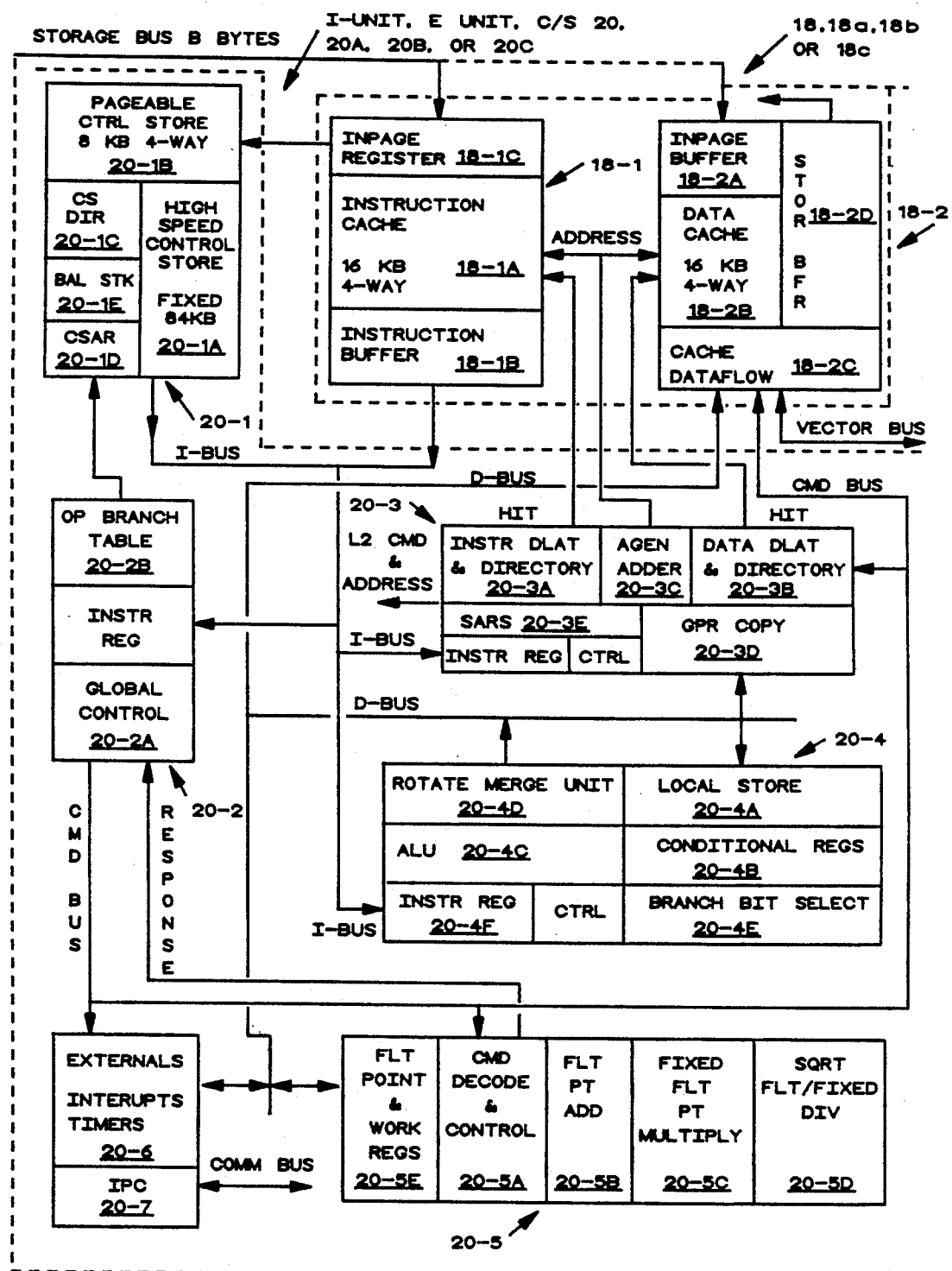
FIG. 3 is a detailed block diagram of the instruction execution unit.

Referring to FIG. 3, a detailed construction of each instruction/execution unit (20 in FIG. 1 or one of 20a–20c in FIG. 2) and its corresponding L1 cache (18 in FIG. 1 or one of 18a–18c in FIG. 2) is illustrated. In FIG. 1 and in FIG. 2, the instruction/execution units 20, 20a, 20b and 20c are disposed in a block labelled "I-unit E-unit C/S (92KB)". This block may be termed the "processor", the "instruction processing unit", or, as indicated above, the "instruction/execution unit". For the sake of simplicity in the description provided below, each of the blocks 20, 20a–20c will be called the "processor". In addition, the "I/D caches (L1)" will be called the "L1 cache". FIG. 3 provides a detailed construction for the processor (20, 20a, 20b or 20c) and for the L1 cache (18, 18a, 18b or 18c).

In FIG. 3, the processor (one of 20, 20a–20c) comprises the following elements. The control store subsystem 20-1 comprises a high speed fixed control store 20-1a of 84k bytes, a pageable area (8k byte, 2k word, 4-way associative pageable area) 20-1b, a directory 20-1c for the pageable control store 20-1b, a control store address register (CSAR) 20-1d, and an 8-element branch and link (BAL STK) facility 20-1e. Machine state controls 20-2 include the global controls 20-2a for the processor, an op branch table 20-2b connected to the CSAR via the control store origin address bus which is used to generate the initial address for microcoded instructions. An address generation unit 20-3 comprises 3 chips, a first being an instruction cache DLAT and directory 20-3a, a second being a data cache DLAT and directory 20-3b, a third being an address generation chip 20-3c connected to the L1 cache 18, 18a–18c via the address bus. The instruction DLAT cache portion of the L1 cache via four "hit" lines which indicate that the requested instruction will be found in the instruction cache portion 18-1a of the L1 cache. Likewise, four "hit" lines connect the data DLAT and directory 20-3b indicating that the requested data will be found in the data cache 18-2b portion of the L1 cache. The address generation unit 20-3 contains copies of the 16 general purpose registers used to generate addresses (within GPR COPY 20-3d) and includes three storage address registers (SARS) 20-3e, used to provide addresses to the microcode for instruction/execution. A fixed point instruction/execution unit 20-4 is connected to the data cache 18-2 via the data bus (D-bus) and contains a local store stack (local store) 20-4a which contains the 16 general purpose registers mentioned above and a number of working registers used exclusively by the microcode; condition registers 20-4b contain the results of a number of arithmetic and shift type operations and contain the results of a 370 condition code; a four-byte arithmetic logic unit (ALU) 20-4c; an 8-byte rotate merge unit 20-4d; and a branch bit select hardware 20-4e which allows the selection of bits from various registers which determine the direction of a branch operation, the bits being selected from general purpose registers, working registers, and the condition registers. A floating point processor 20-5 includes floating point registers and four microcode working registers 20-5e, a command decode and control function 20-5a, a floating point adder 20-5b, a fixed point and floating point multiply array 20-5c, and a square-root and divide facility 20-5d. The floating point processor 20-5 is disclosed in U.S. patent application Ser. No. 102,985, entitled "Dynamic Multiple Instruction Stream Multiple Data Multiple Pipeline Apparatus for Floating Point Single Instruction Stream Single Data Architecture", filed on Sep. 30, 1987, now U.S. Pat. No. 4,916,652, the disclosure of which is incorporated by reference into the specification of this application. The ALU 20-4c contains an adder, the adder being disclosed in pending patent application Ser. No. 066,580, filed Jun. 26, 1987, now U.S. Pat. No. 4,914,617 entitled "A High Performance Parallel Binary Byte Adder", the disclosure of which is incorporated by reference into the specification of this application. An externals chip 20-6 includes timers and interrupt structure, the interrupts being provided from the I/O subsystem 14, and others. An interprocessor communication facility (IPC) 20-7 is connected to the storage subsystem via a communication bus, thereby allowing the processors to pass messages to each other and providing access to the time of day clock.

In FIG. 3, the L1 cache (one of 18, 18a, 18b or 18c) comprises the following elements. An instruction cache 18-1, which comprises a 16k byte/4-way cache 18-1a, a 16-byte instruction buffer 18-1b at the output thereof, and an 8-byte inpage register 18-1c at the input from storage. The storage bus, connected to the instruction cache 18-1 is eight bytes wide, being connected to the inpage register 18-1c. The inpage register 18-1c is connected to the control store subsystem 20-1 and provides data to the subsystem in the event of a pagable control store miss and new data must be brought into the control store. A data cache 18-2 comprises an inpage buffer 18-2a also connected to the storage bus; a data cache 18-2b which is a 16k byte/4-way cache; a cache dataflow 18-2c which comprises a series of input and output registers and connected to the processor via an 8-byte data bus (D-bus) and to the vector processor 2a–22c) via an 8-byte "vector bus"; and an 8-element store buffer (STORE BFR) 18-2d.

A description of the functional operation of a processor and L1 cache shown in FIG. 3 will be provided in the following paragraphs with reference to FIG. 3 of the drawings. Assume that an instruction to be executed is located in the instruction cache 18-1a. The instruction is fetched from the instruction cache 8-1a and is stored in the instruction buffer 18-1b (every attempt is made to keep the instruction buffer full at all times). The instruction is fetched from the instruction buffer 18-1b and is stored in the instruction registers of the address generation chip 20-3, the fixed point execution unit 20-4, and the machine state controls 20-2, at which point, the instruction decoding begins. Operands are fetched from the GPR COPY 20-3d in the address generation unit 20-3 if an operand is required (normally, GPR COPY is accessed if operands are required for the base and index registers for an RX instruction). In the next cycle, the address generation process begins. The base and index register contents are added to a displacement field from the instruction, and the effective address is generated and sent to the data cache 18-2 and/or the instruction cache 18-1. In this example, an operand is sought. Therefore, the effective address will be sent to the data cache 18-2. The address is also sent to the data DLAT and directory chip 20-3b (since, in this example, an operand is sought). Access to the cache and the directories will begin in the third cycle. The DLAT 20-3b will determine if the address is translatable from an effective address to an absolute address. Assuming that this translation has been previously performed, we will have recorded the translation. The translated address is compared with the output of the cache directory 20-3b. Assuming that the data has previously been fetched into the data cache 18-2b, the directory output and the DLAT output are compared; if they compare equal, one of the four "hit" lines are generated from the data DLAT and directory 20-3b. The hit lines are connected to the data cache 18-2b; a generated instruction as an address, the op-branch table providing the beginning address of the microcode routine needed to execute the instruction. These instructions, as well as others, require more than 1 cycle to execute. Therefore, instruction decoding is suspended while the op-branch table is being searched. In the case of microcode, the I-BUS is utilized to provide microinstructions to the decoding hardware. The instruction cache 18-1a is shut-off, the control store 20-1a is turned-on, and the microinstructions are passed over the I-BUS. For floating point instructions, decoding proceeds as previously described, except that, during the address generation cycle, a command is sent to the floating point unit 20-5 to indicate and identify the proper operation to perform. In an RX floating point instruction, for example, an operand is fetched from the data cache 18-2b, as described above, and the operand is transmitted to the floating point processor 20-5 in lieu of the fixed point processor 20-4. Execution of the floating point instruction is commenced. When complete, the results of the execution are returned to the fixed point execution unit 20-4, the "results" being condition code, and any interrupt conditions, such as overflow.

In the following paragraph, a description of the functional operation of FIG. 3 will be again set forth, this description emphasizing the pipelined nature of such functional operation of FIG. 3.

The first stage of the pipeline is termed instruction decode. The instruction is decoded. In the case of an RX instruction, where one operand is in memory, the base and index register contents must be obtained from the GPR COPY 20-3d. A displacement field is added to the base and index registers. At the beginning of the next cycle, the addition of the base, index, and displacement fields is completed, to yield an effective address.

The effective address is sent to the DLAT and Directory chips 20-3a/20-3b. The high order portion of the effective address must be translated, but the low order portion is not translated and is sent to the cache 18-1a/18-2b. In the third cycle, the cache begins an access operation, using the bits it has obtained. The DLAT directories are searched, using a virtual address to obtain an absolute address. This absolute address is compared with the compare is successful, the "hit" line is generated and sent to the cache chip 18-1a/18-2b. Meanwhile, the cache chip has accessed all four associativity classes and latches on output accordingly. In the fourth cycle, one of the four "slots" or associativity classes are chosen, the data is aligned, and is sent across the data bus to the fixed or floating point processor 20-4, 20-5. Therefore, at the end of the fourth cycle, one operand is latched in the ALU 20-4c input. Meanwhile, in the processor, other instructions are being executed. The GPR COPY 20-3d and the local store 20-4a are accessed to obtain the other operand. At this point, both operands are latched at the input of the ALU 20-4c. One cycle is taken to do the computation, set the condition registers, and finally write the result in the general purpose registers in the GPR COPY 20-3d. The result may be needed, for example, for address computation purposes. Thus, the result would be input to the AGEN ADDER 20-3c. During the execution of certain instruction, no access to the caches 18-1a/18-2b is needed. Therefore, when instruction decode is complete, the results are passed directly to the execution unit without further delay (in terms of access to the caches). Therefore, as soon as an instruction is decoded and passed to the address generation chip 20-3, another instruction is decoded.

Multiple Transfer Instructions

Having thus described the IBM System 370 architecture as the preferred embodiment for practicing the subject invention, the details of the specific implementation are described.

The subject invention relates specifically to the 370 RX type multiple instructions which are used to load or store one to N of the architected registers, where N is the maximum number of registers specified by the architecture. These instructions include LM (load multiple), STM (store multiple), LAM (load access register multiple) and STAM (store access register multiple). The architected registers are GPRs (General Purpose Registers) for LM and STM and ARs (Access Registers) for LAM and STAM. Each of these registers holds one word (four bytes) of data.

The operand data can vary from one to N words in length, and the storage location can start at any byte address. The hardware used divides each instruction into smaller "mini-instructions" which are subsequently executed in a pipelined fashion, thereby implementing the 370 instruction without the overhead associated with microcode setup time or the delays characteristic of serial execution.

Several exception conditions are possible during the execution of the mini-instructions. These exceptions include storage protection, addressing exception, and TLB (table look aside buffer) miss and page fault.

Storage protection, addressing exceptions and page fault exceptions occur less frequently and are handled by microcode. However, TLB misses occur more frequently, and thus, special hardware has been installed to handle this condition during execution of the LM, STM, LAM, and STAM instructions.

The general instruction format for these instructions are:

| LM   | R1,R3,D2(B2) |
| STM  | R1,R3,D2(B2) |
| LAM  | R1,R3,D2(B2) |
| STAM | R1,R3,D2(B2) | where R1 and R3 are fields of the instruction respectively specifying the first and last registers to be loaded or stored. These instructions are referred to as macro-instructions. The registers defined for LM and STM are the GPRs, and the registers defined for LAM and STAM are the ARs. For the LM and LAM instructions, the general purpose registers R1, R1+1, R1+2, . . . R3 are loaded from address D2(B2) with register 0 following register 15. The quantity D2(B2) is calculated by adding the displacement D2 with the contents of the base register B2. The STM and STAM, the registers R1, R1+1, R1+2, . . . R3 are stored to address D2(B2) again with register 0 following register 15.

The RAM chosen for the GPRs in this design is a multi-port array (two write ports and three read ports), enabling writes into two different addresses simultaneously. Each write port is four bytes wide and is controlled by its own address and enable lines. The three read ports also have simultaneous read capability. These features, coupled with an eight byte data bus, allow the loading or storing of two GPRs simultaneously. Beginning with the R1 field of the original instruction, a +0/+1/+2 adder is used to generate a set of mini-instructions, each one loading or storing up to two registers. Different sequences of instructions are generated depending on the alignment of the storage address. The mini-instructions are executed in a pipelined fashion until the final register specified by the R3 field has been loaded or stored.

The RAM chosen for the ARs in this design is a two port array which has one four byte wide read port and one four byte wide write port. This implies only one register may be loaded per cycle. Each mini-instruction thus loads or stores one AR, with execution continuing in a pipelined fashion until the final AR has been loaded or stored.

The instructions can be implemented such that execution of each macro-instruction is composed of the execution of several "unit operations". Each such unit operation is called a mini-instruction. The number of operations required depends on the R fields of the instruction. Furthermore, the operations can be implemented in a hardware loop. In each loop the register fields are compared with the R3 field of the instruction. The loop terminates when a match occurs.

The processor design is controlled by the format of the 370 instruction; the logic of the processor therefore uses the instruction as an input. The objective then is to construct the operation requests of the macro-instruction as a subset of the 370 instruction. This will minimize the additional circuitry needed to recognize, decode, control and execute the functions. Mini-instructions are created using the 370 macro-instructions as inputs. The mini-instructions have the same format as the macro-instruction with the exception of the contents of the R1 and R2 fields. The op code of the original macro-instruction is treated as a single operation instead of multiple operations by the logic.

Figure 4:
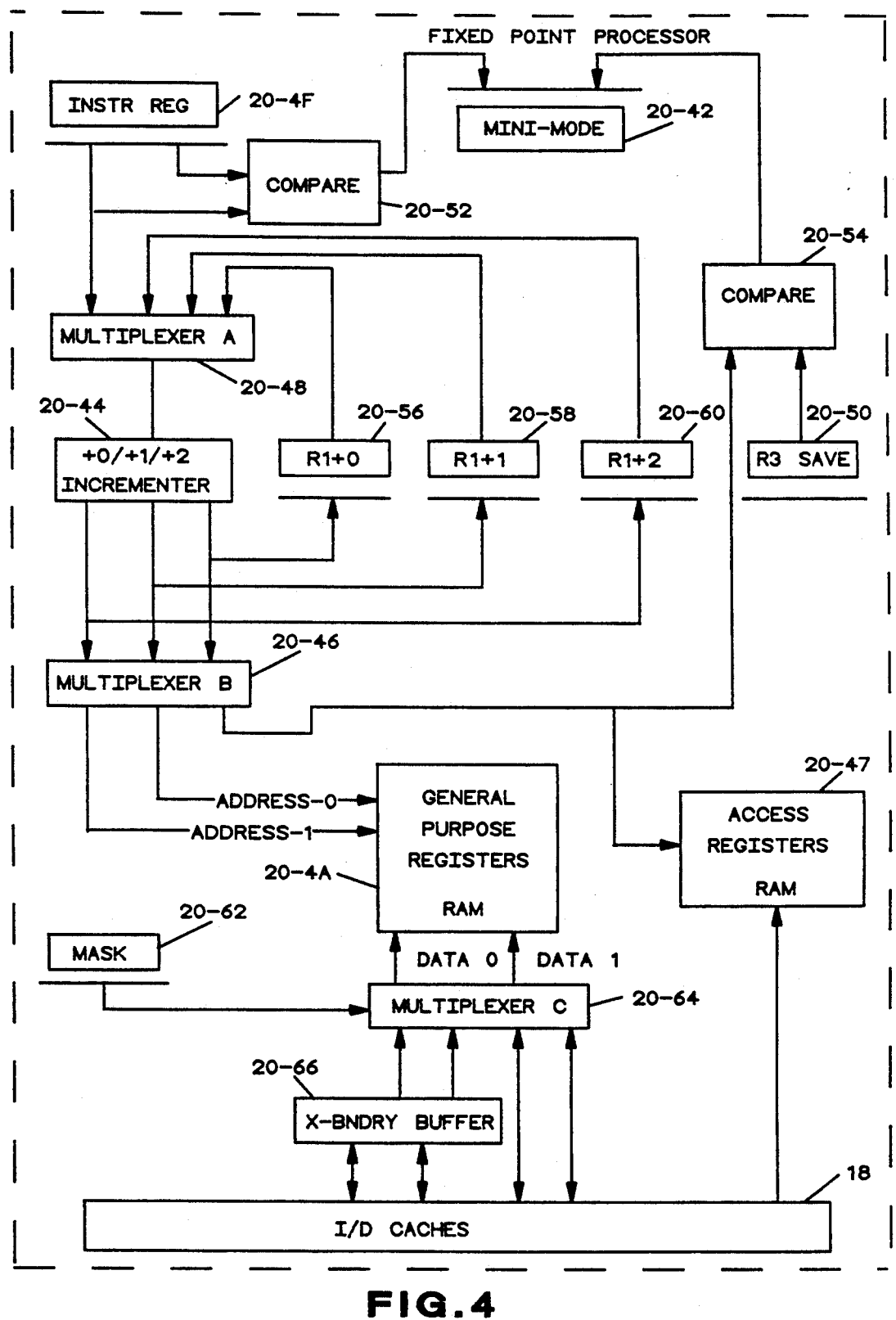
FIG. 4 is a block diagram of Fixed Point Processor 20-4 including the present invention.

Referring to FIG. 4, when the original macro-instruction is decoded from the instruction register 20-4F and $|R1 - R3| > 1$, the control latch mini-mode 20-42 indicates loop mode or mini-instruction mode, is set. The $+0/+1/+2$ incrementer 20-44 is seeded with the R1 field of the macro-instruction and is then used to generate the value of the R fields for the mini-instructions. Two of the three adder outputs are chosen by multiplexer 20-46 to replace the R fields of the macro-instruction to create a mini-instruction. Multiplexer 20-48 chooses an output of the incrementer 20-44 to act as its next seed. This process continues until an output of the incrementer 20-44 matches the value in the R3 Save register 20-50, at which time the mini-instruction mode latch 20-42 will be reset and normal instruction processing will resume.

The first storage address is formed by field D2(B2). However, when the loop mode control latch 20-42 is set, the B2 and D2 fields of the mini-instruction are ignored by the address generation logic. The subsequent storage addresses are formed by advancing the previously calculated address to the next doubleword location.

As discussed above, the storage system used is conceptually divided into eight byte units known as doublewords (DW). A single fetch or store operation cannot cross this boundary. Thus, a normal four byte storage operation beginning in the seventh byte of an eight byte unit and continuing into the second byte of the next unit would require two storage accesses to complete. Such a fetch or store is known as a cross boundary or off DW boundary operation. The position of a storage address with respect to a doubleword boundary is known as alignment. If the storage address is not on a doubleword boundary, there are two design options. The first is to access eight bytes of data on every operation until the macro-instruction is completely executed, allowing storage to detect and handle the cross boundary condition by accessing storage twice. The second is to access data from the specified storage address up to the next doubleword boundary for the first operation, then to access a full doubleword from one boundary to the next for the subsequent operations, and complete execution by fetching from the last doubleword boundary to the end of the desired data. This second method eliminates the cross boundary cache accesses and thus shortens the overall execution time for the instruction. It is therefore chosen for this processor design.

For each fetch, a request consisting of the effective address and the operand length is sent to storage. In order to prevent storage from detecting a cross boundary condition, the request sent is always for only one byte of data which is then left aligned on the data bus. However, eight bytes are driven back and thus the processor is free to choose how to merge the data.

A LM instruction where $R1 = R3$ is executed by hardware as a regular four byte load with no additional delays. Similarly, a LM instruction where $R1+1 = R3$ is treated as an eight byte load. The mini-instruction mode latch 20-42 is not set, and therefore, hardware will not divide the macro-instruction into mini-instructions. The remaining and majority of the LM instructions will contain R1 and R3 fields such that $|R1-R3| > 1$. The sequence of operations necessary to implement such a LM instruction are classified into three cases, dependent upon the storage address and the number of registers to be loaded.

If the data is already doubleword aligned and $R1-R3| > 1$, the instruction is classified as a case 1. The instruction LM GPR1,GPR5 D2(B2), where the D2(B2) resolves to a doubleword boundary, is then divided into the following mini-instructions:

| | |
|---|---|
| LMO1 | GPR1,GPR2 |
| LMO2 | GPR3,GPR4 |
| LMO3 | GPR5,GPR5 |

Latch 20-42 is set indicating mini-instruction mode and the last register to be loaded, GPR5 in this case, is saved for later use. GPR1 is put into the $+0/+1/+2$ adder 20-44 and the outputs GPR1 and GPR2 replace the R fields of the macro-instruction. The +2 output, GPR3, is returned into the adder for use in generation of the next mini-instruction. This sequence continues until an output of the adder matches the R3 field in the save register. At this time the mini-instruction mode latch 20-42 is reset and normal instruction processing resumes.

The first mini-instruction will be treated as an eight byte load. When the data returns from storage GPR1 will be written from the high half of the data bus and GPR2 will be written from the low half; GPR3 and GPR4 are treated in the same manner. Although the last instruction specifies GPR5 twice, a single write port enable will cause GPR5 to be written from the high half of the data bus only.

When the address is not on a doubleword boundary, the mini-instruction sequence is less obvious. Consider the following arrangement in storage:

| address | contents |
|---|---|
| 0 | abcdefgh |
| 8 | iklmnop |
| 16 | qrstuvwx | where each letter of the contents is a byte of data.

A LM GPR1,GPR5 D2(B2) when D2(B2) resolves to 2 should then result in GPR1 = cdef, GPR2 = ghij, GPR3 = klmn, GPR4 = opqr, and GPR5 = stuv. Data alignment addresses such as this which are in the first half of a doubleword or on a word boundary are classified as case 2.

To accelerate execution of the LM instruction, the extra storage cycle normally caused by the operation must be eliminated. This is accomplished by employing a data saving and merging system. To execute this, the first mini-instruction would only load GPR1. Storage is requested to rotate the data such that the first fetch resulted in the bytes "cdefghab". The entire doubleword is saved in a register known as the cross boundary buffer 20-66 effecting a save of the first two bytes of the data destined for the GPR2 register, "gh". The word "cdef" is then written into GPR1. After the storage address is advanced by eight, the next mini-instruction can load GPR2 and GPR3 and save the first two bytes of the data destined for GPR4. The data fetch for this instruction results in "lmnopij" on the data bus. An eight bit mask 20-62 set at 11110011 will choose "klmn" and "ij" from the data bus and "gh" from the cross boundary buffer 20-66. Thus, the data "klmnghij" can be written into the GPR RAM 20-4a. Note, however, the twisting of the registers. It is no longer GPR2,GPR3 which is being written as in the doubleword aligned condition of the case 1 LM, but rather GPR3,GPR2. The mini-instructions for this case must therefore be generated in reverse to ensure the correct data is written into the proper register. The sequence for a case 2 LM is then the following:

| LMO1 | GPR1,GPR1 |
| LMO2 | GPR3,GPR2 |
| LMO3 | GPR5,GPR4 |

It is necessary to set a latch indicating a case 2 LM to prevent the mini-instruction LM GPR3,GPR2 from being executed as a sixteen register load.

A case 3 type instruction exists if the address from which data is being loaded falls in the second half of the doubleword. Using the same reasoning as for a case 1 LM, it is necessary to create the following mini-instructions:

| LMO1 | GPR1,GPR1 |
| LMO2 | GPR1,GPR2 |
| LMO3 | GPR3,GPR4 |
| LMO4 | GPR5,GPR5 |

The first load will bring in only part of GPR1. The second load will then bring in the remainder of GPR1, all of GPR2, and part of GPR3. The remaining mini-instructions are executed in a similar fashion. Normal instruction stream processing can resume as soon as the decode cycle for the final mini-instruction is complete.

The storage address with dynamic address translation (DAT) enabled is translated by the TLB. If a TLB miss occurred, the storage address is translated by means of the architected page and segment tables. For design ease, the instruction is re-executed at the completion of the translation. Special attention is given to the general purpose register content prior to re-execution.

Figure 5:
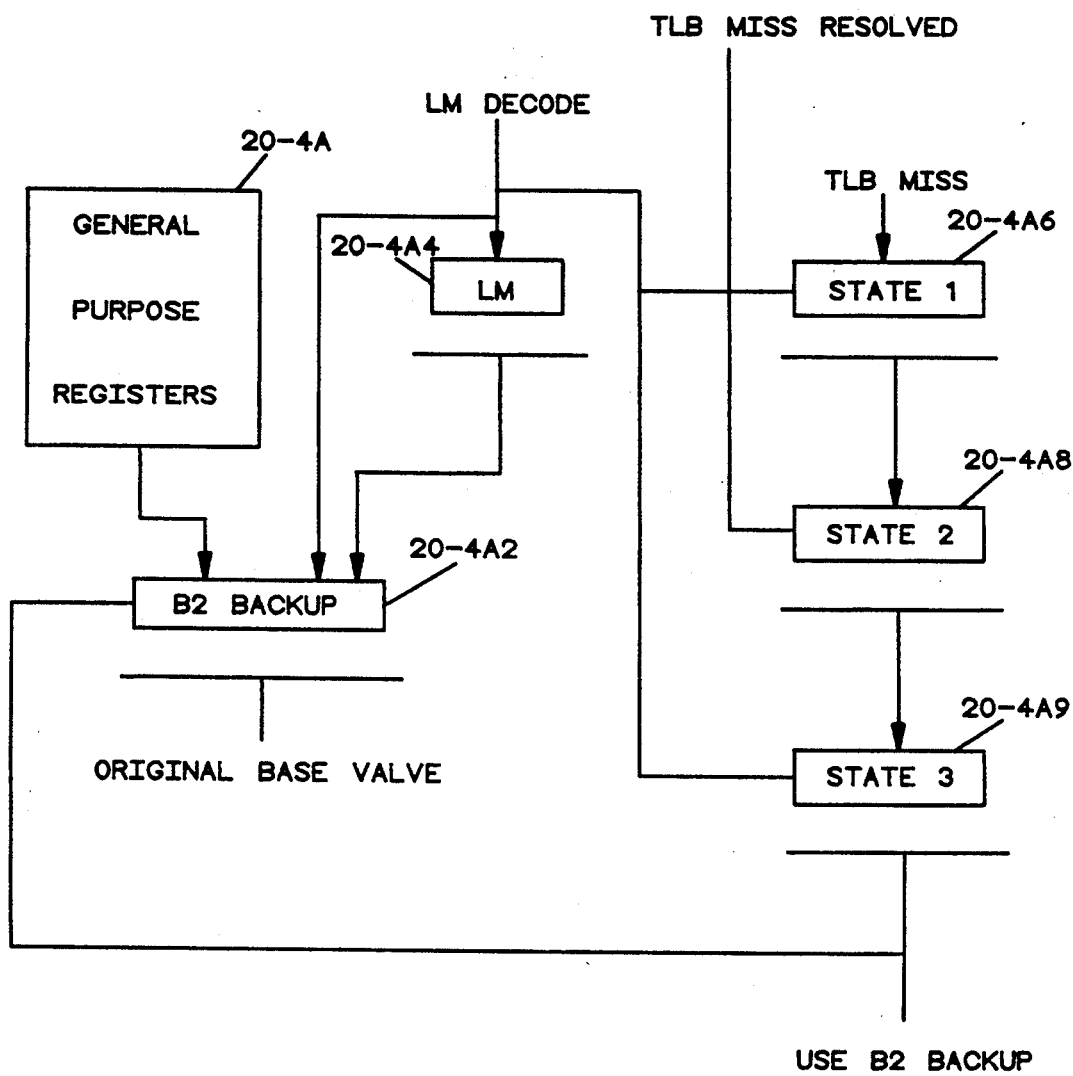
FIG. 5 is a schematic diagram of a Table Lookaside Buffer Miss.

Refer to FIG. 5 for a schematic representation.

The base register (B2) intended for use in the LM macro-instruction is saved in a back-up register 20-4a2 in the event that a TLB miss occurs in the sequence and that the register specified by the B2 field has been overwritten with new data due to execution of the LM instruction. Consider the following Load Multiple instruction:

LM R4,R8 D2(B2)
where B2=5

In this case, after execution of the first mini LM instruction, GPR5 will be updated with new data from storage, thus destroying the original base register value. If a TLB miss occurs after this point, then the LM instruction cannot be re-executed once the TLB miss is resolved because the original base register value has been lost. Therefore, the original base register is always saved upon execution of the LM macro-instruction before execution of any LM mini-instructions completes.

The base register is loaded into the B2 BACKUP register 20-4a2 after a LM macro-instruction is detected and the register is held until another LM macro-instruction occurs. Execution of LM mini-instructions then begins and the hardware will generate storage addresses for each LM mini-instruction. If a TLB Miss occurs, a control latch will be set and the execution of a state machine to resolve this interrupt begins. The next state of the machine occurs after address translation has completed. Finally, the last state is reached when the original LM instruction which caused the TLB miss is re-executed. The control signal USE B2 BACKUP causes the hardware to use the value in the B2 BACKUP register 20-4a2 as the base value instead of the base value from the GPR array 20-4a.

Note that when the LM instruction is re-executed after the TLB miss is resolved, the hardware cannot detect the difference between a new LM macro-instruction and an old LM macro-instruction which is being re-executed. The USE B2 BACKUP control line is used to detect this case and will block the B2 BACKUP register from being overwritten with the modified base value from the GPR2. The hardware will hold the USE B2 BACKUP line high until after the first LM mini-instruction has been executed.

When the storage address fails to be translated by the page and segment table means, a page fault condition occurs. Unlike systems without retry capability, this processor does not perform a pre-test of the storage operand before execution begins. Storage addresses are translated as the cache is accessed. If a page fault occurs, a retry mechanism is used to restore the register contents to the correct value.

As with LM, a STM instruction where R1 = R3 is executed by hardware as a regular four byte store with no additional delays. Similarly, a STM instruction where R1+1 = R3 is treated as an eight byte store. The sequence of operations necessary to implement the remaining STM instructions are classified into the same three cases as with LM, dependent upon the storage address and the number of registers to be stored as specified by the macro-instruction.

The instruction STM GPR1,GPR5,D2(B2), where the D2(B2) resolves to a doubleword boundary, is divided into the following mini-storage:

| STMO1 | GPR1,GPR2 |
| STMO2 | GPR3,GPR4 |
| STMO3 | GPR5,GPR5 |

Mini-instruction generation functions in the same manner as for the LM instruction. Likewise, the instruction STM GPR1,GPR6,D2(B2) is divided into:

| STMO1 | GPR1,GPR2 |
| STMO2 | GPR3,GPR4 |
| STMO3 | GPR5,GPR6 |

For STM instructions, eight bytes of data are stored at a time. It is not necessary for the processor to rotate data in these case 1 type STMs.

The address D2(B2) can also resolve to something not on a doubleword boundary. As in the LM case, the second storage access which normally occurs during cross boundary storage operations must be eliminated for performance reasons. To achieve this the processor reads the first two registers from the GPRs and rotates it as an eight byte unit until the data is aligned with the desired storage result. This is best illustrated by example. Consider the instruction STM GPR1,GPR3,D2(B2) where:

| | |
|---|---|
| GPR1 | contents: abcd |
| GPR2 | contents: efgh |
| GPR3 | contents: ijkl | and making D2(B2) resolved to 4, making it a case 2 STM storing an odd number of registers. If storage contents were initialized to all x,s, the desired storage result would be:

| address | contents |
|---|---|
| 0 | xxxxabcd |
| 8 | efghijkl |

The first mini-instruction generated is STM GPR1,GPR2,D2(B2). The processor then reads out "abcdefgh" from GPR1 and GPR2 and rotates the result as an eight byte unit to yield "efghabcd". This data is saved in register and is also sent to storage with a request to store four bytes. The word "abcd" is then stored at D2(B2). Upon generating the following mini-instruction, an output of the +0/+1/+2 incrementer 20-44 will compare with the R3 save register 20-50 value and the mini-state latch 20-42 will be reset. Thus, the mini-instruction STM GPR3,GPR3,D2(B2) will be generated. GPR3 is read and merged with the data in the save register based on the original storage address. The result "efghikjl" is then sent to storage to complete the instruction.

Suppose instead the macro-instruction were to be STM GPR1,GPR4, storing an even number of registers, and the address still resolved to "4". If GPR1, GPR2, and GPR3 were as above and GPR4 were initialized to the value "mnop", the desired results would then be:

| address | contents |
|---|---|
| 0 | xxxxabcd |
| 8 | efghijkl |
| 16 | mnopxxxx |

The saved R3 value would be GPR4. As with the above instruction, the first mini-instruction generated would be STM GPR1,GPR2. This would store the GPR1 value "abcd" and put "efgh" in the save register. The next mini-instruction generated is then STM GPR3,GPR4. Execution of this will store the "efg" from the save register and the GPR3 value "ijkl". Note that although the original saved R3 value of "GPR4" has been realized at the output of the +0/+1/+2 incrementer 20-44, mini-instruction generation cannot yet terminate because the value of GPR has not yet actually been written to storage. Thus, another mini-instruction STM GPR4,GPR4 must be created. To terminate mini-instruction generation it is not only necessary to compare the adder output to the saved R3 value, but also for the logic to recognize whether there are an even or odd number of registers being stored. Execution of the STM GPR4,GPR4 mini-instruction will then store the GPR4 value "mnop" and normal processing can resume.

Using the same reasoning, it is necessary to create the following mini-instructions for case 3 STMs:

| STM GPR1,GPR5,D2(B2) => odd number of registers | |
|---|---|

| -continued | |
|---|---|
| STMO1 | GPR1,GPR2,D2(B2) |
| STMO2 | GPR3,GPR4,D2(B2) |
| STMO3 | GPR5,GPR5,D2(B2) |
| STMO4 | GPR5,GPR5,D2(B2) |
| STM GPR1,GPR6,D2(B2) => even number of registers | |
| STMO1 | GPR1,GPR2,D2(B2) |
| STMO2 | GPR3,GPR4,D2(B2) |
| STMO3 | GPR5,GPR6,D2(B2) |
| STMO4 | GPR6,GPR6,D2(B2) |

These are executed in the same fashion as the other STMs.

Each STM mini-instruction sends a request to storage to store the necessary data. All the requests necessary for execution of a STM macro-instruction are buffered until the last request is received, at which time storage can begin storing data to actual memory. If the TLB miss is encountered during the STM mini-instruction execution, the buffered store requests are discarded and the STM macro-instruction is re-executed upon completion of address translation.

As with TLB miss, occurrence of a page fault during STM will cancel all buffered mini-instructions. The STM macro-instruction will be re-executed following resolution of the fault using a retry mechanism.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims:

We claim:

1. A method for executing a software instruction which requires transfer of a first block of data using computer hardware that executes software instructions that conform to a predetermined architecture which limits transfer to blocks having predetermined, limited characteristics, said method comprising the steps of:
   reading the software instruction;
   determining if said first block conforms to the limited characteristics of said predetermined architecture, and
   if so, executing said software instruction using said computer hardware, and
   if not, generating a plurality of mini-instructions based on said software instruction, each of said mini-instructions implementing the software instruction for a respective portion of said first block in conformance with said limited characteristics of said predetermined architecture, all of said mini-instructions collectively implementing said software instruction.

2. A method as set forth in claim 1 wherein each of said mini-instructions is functionally equivalent to said software instruction except for said characteristics.

3. A method as set forth in claim 1 wherein each of said mini-instructions is identical to said software instruction except for said characteristics.

4. A method for executing a software instruction as set forth in claim 1 wherein:
   said software instruction comprises a plurality of fields specifying the characteristics of said first block and the generating step comprises the steps of:

a) inputting a value derived from at least one of said fields of said software instruction into an incrementor;
b) incrementing the value by one or more amounts to yield one or more respective incremented values;
c) choosing at least one of said incremented values to replace said at least one field of said software instruction to form one of said plurality of mini-instructions;
d) executing said one mini-instructions;
e) repeating steps b-d using progressively incremented values until said executed mini-instructions have collectively implemented said software instruction for said first block of data.

5. A method for executing a software instruction as set forth in claim 1 wherein:
said characteristics of said first block require transfer of more data bytes than the predetermined architecture allows, and each of the mini-instructions instructs transfer of a number of said data bytes which is allowed by said predetermined architecture.

6. A method for executing a software instruction as set forth in claim 1 wherein:
said characteristics of said first block require beginning or ending a data transfer at a byte boundary that is inconsistent with said predetermined architecture, and each of said mini-instructions begins or ends a data transfer at a byte boundary which is consistent with said predetermined architecture.

7. A system for executing a software instruction which requires transfer of a first block of data, said system comprising:
computer hardware means for executing software instructions that conform to a predetermined architecture which limits transfer to blocks having predetermined, limited characteristics;
means for reading the software instruction;
determining means for determining if said first block conforms to the limited characteristics of said predetermined architecture; and
generating means, responsive to said determining means, for generating a plurality of mini-instructions based on said software instruction if said first block does not conform to said limited characteristics of said predetermined architecture, each of said mini-instructions implementing the software instruction for a respective portion of said first block in conformance with said limited characteristics of said predetermined architecture, all of said mini-instructions collectively implementing said software instruction.

8. A system as set forth in claim 7 wherein each of said mini-instructions is functionally equivalent to said software instruction except for said characteristics.

9. A system as set forth in claim 7 wherein each of said mini-instructions is identical to said software instruction except for said characteristics.

10. A system for executing a software instruction as set forth in claim 7 wherein:
said software instruction comprises a plurality of fields specifying said characteristics of said first block and the generating means comprises:
incrementing means for incrementing a value derived from at least one of said fields of said software instruction, by one or more amount to yield one or more respective incremented values;
first selecting means for selecting at least one of said incremented values to replace said at least one field of said software instruction to form one of said plurality of mini-instructions;
executing means for executing said one mini-instruction; and
second selecting means for selecting at least one of said incremented values to be input to said incrementing means; and
wherein the incrementing means, first selecting means, executing means and second selecting means repeat their respective functions using said at least one of said incremented values as input to said incrementing means to form another of said plurality of mini-instructions, the plurality of mini-instructions being functionally equivalent to said software instruction.

11. A system for executing a software instruction as set forth in claim 7 wherein:
said characteristics of said first block require transfer of more data bytes than the predetermined architecture allows, and each of the mini-instructions instructs transfer of a number of said data bytes which is allowed by said predetermined architecture.

12. A system for executing a software instruction as set forth in claim 7 wherein:
said characteristics of said first block require beginning or ending a data transfer at a byte boundary that is inconsistent with said predetermined architecture and each of mini-instructions begins or ends a data transfer at a byte boundary that is consistent with said predetermined architecture.

13. The system of claim 10 wherein said first and said second selecting means are combined to form a single selecting means.

* * * * *